3,364,121
NUCLEAR REACTOR POWER PLANT ARRANGEMENT
Donald Carroll Schluderberg, Lynchburg, Va., assignor to The Babcock & Wilcox Company, New York, N.Y., a corporation of New Jersey
Filed Apr. 20, 1965, Ser. No. 449,555
11 Claims. (Cl. 176—59)

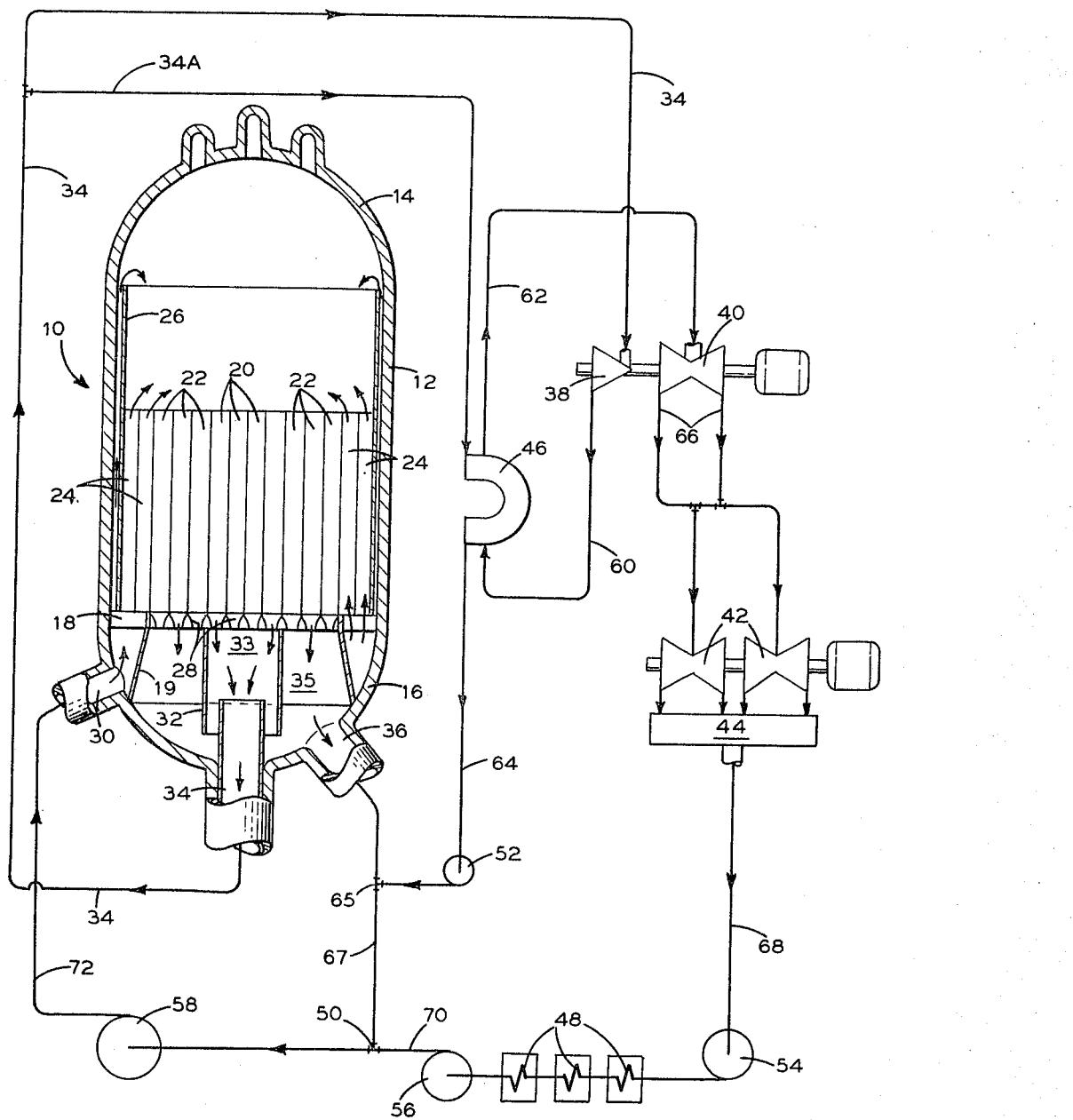

The present invention relates in general to a nuclear reactor power plant arrangement and to a method of operating the same, and more specifically to a vapor cooled system in which the cycle efficiency is maximized while at the same time safety considerations are optimized.

The present invention is directed to a reactor power system arranged to operate with a modified Loeffler cycle in which a coolant fluid is circulated through a nuclear reactor where it is heated, a portion of the heated fluid then being passed through heat removal means such as a turbine or a heat exchanger in which the fluid is cooled, the cooled fluid then being mixed with the remainder of the reactor coolant fluid and heated thereby before reintroduction into the reactor.

In nuclear reactor systems of the steam-cooled type utilizing a Loeffler cycle, overall plant efficiencies have had to be sacrificed in order to assure the maintenance of fuel clad temperatures within acceptable use limits. It is well known that for a given operating pressure thermodynamic systems attain the highest possible efficiencies when using the highest practicable temperatures of the working fluid. Thus there has been a concerted effort to raise fluid temperatures. At the present time the maximum turbine inlet steam temperatures are restricted by the fact that reactor fuel clad temperatures are restricted to a maximum of approximately 1350° F. This is due to the fact that no known fuel cladding material is capable of extended service at higher temperatures.

It has also been found extremely advantageous to fabricate fuel elements with as large a cross sectional area as possible, since this minimizes the total fabrication cost of the reactor core as well as the amount of structural material in the reactor core, which structural material tends to lower the nuclear efficiency of the reactor. However, in high power fuel elements the spacing between adjacent fuel pins may of necessity be so constricted that the coolant acts as though it were flowing through a multiplicity of separate flow channels, with little or no inter-channel mixing occurring from the fuel element inlet to its outlet. Moreover, in large fuel elements the radial power gradient may be so great that the coolant flowing through those areas of the fuel element having a high power level may be heated to a far greater extent than the coolant flowing through areas of much lower power level within the same fuel element. As a result, while it has been known to use orifices or other flow regulating devices in fuel elements to control the rate of coolant flow therethrough and thus to regulate the maximum clad temperatures of the fuel element, the differential heating of the coolant fluid due to the radial variation in power level therein may be so great that the average coolant outlet temperature will not be representative of the clad temperature extremes within the fuel element.

Thus, in a large fuel element operating at a high uniform radial power level, the amount of cooling fluid passing therethrough may be adjusted to maintain the clad temperature below the previously noted limit of 1350° F. and, at the same time, attain a coolant outlet temperature of approximately 1050° F., a relatively efficient turbine inlet temperature. On the other hand, a similar fuel element operating in a different area of the reactor core may have such a large power gradient from one side to the other, due to the radial power gradient common to most reactors, that a coolant flow rate therethrough, sufficient to give a coolant outlet temperature of 1050° F., will result in partial melting of the fuel pins. This is because of the fact that the coolant outlet temperature may be an averaged composite of an extremely low temperature portion of the coolant mixing with an extremely high temperature portion, which high temperature portion results in fuel clad temperatures above the 1350° F. safe use limit.

As a result, it is often necessary to limit the coolant from zones having very high radial power gradients to outlet temperatures far below the desired 1050° F. in order to obtain clad temperatures within the acceptable strength and/or corrosion limits of the clad material. For example, in reactors of the prior art, even where some core zones are capable of producing 1050° F. steam, the allowable temperature of the composite mixture of outlet steam from all of the core zones must be substantially reduced below that which provides the highest system efficiency.

Accordingly, the present invention provides a nuclear reactor having the core arranged with a plurality of parallel coolant flow zones therethrough. At least one of the zones in the reactor is arranged to have a substantially constant radial power level, i.e. having very little power gradient thereacross. Means is provided for passing a coolant fluid in parallel flow relationship through the several zones of the reactor. The reactor of the present invention is also arranged so that the coolant passing through the zone having the substantially constant power level is heated to a temperature above that of the coolant passing through the other parallel flow zones in the reactor. A baffle means is provided at the outlet of the various zones of the fuel elements to maintain the coolant from the several zones separate until it reaches the reactor outlet. An extraction conduit is arranged to communicate with the baffle zone containing the high temperature coolant fluid to remove at least a portion of this fluid while it is still within the confines of the baffle. The remainder of the high temperature fluid, not withdrawn by the extraction conduit is mixed with the lower temperature coolant fluid before leaving the reactor through an outlet conduit.

Furthermore, the present invention provides a nuclear reactor system utilizing the above described reactor wherein the portion of the high temperature coolant fluid which is extracted from the reactor outlet is circulated through a heat removal means, i.e. a turbine, where the fluid is cooled. After being cooled and condensed, this portion of the coolant fluid is heated by mixing with the other, low temperature coolant from the reactor. All of the coolant fluid is then reintroduced into the reactor.

The reactor system of the present invention also provides a divided flow path for that portion of the high temperature coolant fluid which is extracted from the reactor. One leg of the circuit contains a high pressure turbine through which a portion of the fluid is partially expanded. The other leg of the circuit contains a heat exchanger through which the remainder of the extracted fluid is passed to reheat the partially expanded portion prior to further expansion in intermediate and low pressure turbines. The heating portion of the extracted fluid then is brought up to the same pressure as the main body of low temperature fluid leaving the reactor and is recombined therewith. The fluid passing through the turbine is finally condensed and is then brought up to the pressure of the main body of fluid. The condensate is then mixed with the remainder of the fluid which partially reheats and evaporates the condensate. The fluid is then pumped back into the reactor to repeat the cycle.

The present invention thus provides a nuclear reactor system wherein only the high temperature, high efficiency vapor is utilized in a turbine while the remainder of the coolant fluid circulated through the reactor, which is at a lower temperature and which cannot provide the optimum cycle efficiency desired, is utilized only to heat the condensate from the turbine. Furthermore, with the baffle arrangement of the present reactor no circuit is completely isolated from the other circuits so that, should one circuit be constricted or blocked, for example by a sudden closure of the turbine throttle valves, the associated zone in the reactor will not be starved for coolant fluid since the coolant fluid flowing through that zone may mix with the coolant from the other zones beyond the baffle means. As a result, there is no possibility that the flow through any elements within the reactor will be completely shut off with the resultant possibility of melt-down of the fuel elements, resulting in inherent reactor safety.

The various features of novelty which characterize the invention are pointed out with particularity in the claims annexed to and forming a part of this specification. For a better understanding of the invention, its operating advantages and specific objects attained by its use, reference should be had to the accompanying drawing and descriptiv matter in which there is illustrated and described a preferred embodiment of the invention.

The accompanying drawing is a schematic illustration of a reactor system incorporating the present invention. A nuclear reactor, generally indicated at 10, comprises a vertically elongated cylindrical pressure vessel shell 12 having upper and lower closure heads 14 and 16, arranged in a manner well known in the art. An element support plate 18 is arranged in the lower portion of the pressure vessel and is supported therein by an annular skirt member 19 supported from the lower head 16. The support plate 18 is arranged to support and align a plurality of elements including a central zone of fuel elements 20, an outer annular zone of fuel elements 22 and a surrounding zone of blanket elements 24. A thermal shield 26 is arranged around the outer periphery of the blanket elements adjacent the inner surface of the pressure vessel shell 12. The fuel and blanket elements 20, 22 and 24 are arranged as a nuclear core in a manner well known in the art. The lower ends of the blanket and fuel elements are fitted within openings in the support plate 18 and the lower or outlet ends of the fuel elements are provided with adjustable flow nozzles 28. These nozzles are used to regulate the coolant flow through the various fuel elements in a manner which will be more thoroughly described hereinbelow.

An inlet nozzle 30 is provided in the lower head 16 of the pressure vessel for the introduction of a coolant fluid, which in this example is steam, into the annular space defined by the head 16 and the skirt member 19. A baffle member 32 is arranged within skirt member 19 to surround the outlets and form an outlet plenum 33 for the centermost fuel elements 20 and is suspended from support plate 18. This baffle member extends downwardly towards the inside surface of the lower head 16. A coolant extraction conduit or line 34 extends from within baffle 32 and through the lower head 16 to extract the coolant fluid from the central outlet plenum 33. A coolant outlet line 36 is provided in the lower head of the pressure vessel between skirt member 19 and baffle member 32 to withdraw the coolant fluid from the outlet plenum 35 of the outer zone of the fuel elements 22. The coolant steam thus passes upwardly through the blanket elements 24 and around the thermal shield 26, being heated thereby. The coolant steam then reverses direction and flows downwardly in parallel flow paths through the fuel elements in zones 20 and 22 to be superheated thereby.

The reactor illustrated has a minimum power gradient across the central zone of fuel elements 20 with a relatively large power gradient across the outer annular zone of fuel elements 22. Accordingly, the coolant steam flow through the central zone of fuel elements 20 may be regulated by nozzles 28 to achieve the maximum possible outlet temperature of approximately 1050° F. without exceeding the fuel clad temperature limits of approximately 1350° F. The outer annular zone of fuel elements 22, having a steep power gradient thereacross must have the steam flow therethrough regulated so as to maintain all of the fuel clad temperatures below the clad temperature limit and, as a result, the coolant steam outlet temperature from this zone is approximately 950° F.

The reactor system of the present invention comprises, in addition to the reactor 10, a high pressure turbine 38, an intermediate pressure turbine 40 and a low pressure turbine 42 with their associated generators, condenser 44, reheat heat exchanger 46, feed-water heaters 48, mixing T 50, pumps 52, 54, 56 and 58, and associated piping.

As previously noted, the most efficient system based on presently available cladding materials will be obtained when producing superheated steam at 1050° F. for delivery to the high pressure turbine. Accordingly, the 1050° F. steam leaving the central zone of fuel elements 20 within baffle 32 is extracted through line 34 which connects the reactor 10 to the inlet of the high pressure turbine 38. Line 34 also branches at 34A supplying the primary side of the reheat heat exchanger 46. The exhaust from the high pressure turbine 38 is directed via line 60 to the inlet of the secondary side of the reheat heat exchanger 46 where it is reheated by indirect heat transfer contact with the portion of the high temperature steam circulating through the primary side of heat exchanger 46. The partially expanded steam is thus reheated prior to introduction into the intermediate pressure turbine 40 through line 62. The cooled steam, still in the vaporous state, upon leaving the primary side of heat exchanger 46 through line 64 is introduced into pump 52 where its pressure is raised to that of the coolant leaving the outer zones of the reactor through outlet line 36. The fluids in lines 36 and 64 are then mixed via T 65. The reheated steam, after passing through intermediate turbine 40, is then fed by lines 66 to the low pressure turbine 42 from which it enters the condenser 44. The condensate from condenser 44 is pumped via line 68 and condensate pump 54 into and through interstage feed-water heaters 48, which operate in a manner well known in the art, and then via line 70 and feed water pump 56 to the mixing T 50 where it is mixed, reheated, and revaporized by the much higher temperature coolant fluid in line 67 from mixing T 65. The combined, entire quantity of coolant fluid is finally reintroduced into inlet nozzle 30 via line 72 and main circulating pump 58.

While the present reactor has been illustrated with a central zone having a substantially constant power level and with a relatively higher radial power gradient in the outer zones, it will be appreciated that the reactor may be arranged so that zones other than the central zone will have the substantially level power gradient. The construction thereof will thus be varied to the extent necessary to extract high temperature steam from the zones with substantially constant power levels for introduction into the high pressure turbine and the reheat heat exchanger, with the remainder of the coolant from the other zones being used to heat the feed water.

It will also be noted that the baffle 32 in the outlet chamber of the present example is so arranged that the extraction line 34 may extract only high temperature steam therefrom so long as the required amount of high temperature steam is being produced in the central zone and delivered to the plenum 33. On the other hand, the plenum 33 is open to the outlet plenum 35 of the other zones of the reactor so that should the high pressure turbine trip-out, or pump 52 shut down, the flow of coolant through zone 20 would not stop but would continue by flowing through outlet line 36. Thus, continued circulation of coolant through all of the zones of the reactor will be assured with only the main circulation pump 58 in operation.

Inasmuch as it may be desirable to maintain the coolant fluid within the reactor in a single phase, it is necessary to vaporize the condensate, in systems utilizing steam as the reactor coolant, prior to its introduction into the reactor. Accordingly, the present invention utilizes a modified Loeffler cycle wherein a portion of the reactor heat output is utilized to vaporize the condensate. Accordingly, the present invention provides an arrangement wherein the relatively low efficiency, low temperature portion of the steam may be utilized for vaporizing the condensed coolant while the high efficiency, high temperature steam may be used in the turbines and the reheater heat exchanger 46 to provide a very efficient reactor system without penalizing either reactor safety or system flexibility.

The use of the reheat pump 52 to raise the pressure of the reheater fluid prior to mixing with the coolant in line 36 significantly improves the efficiency of the system since main circulating pump 58 need only make up for the pressure drop incurred within the reactor 10 and lines 72, 36 and 67. If reheat pump 52 were not used, the main circulating pump 58 would also have to overcome the pressure drop occurring in the reheat heat exchanger 46 and its associated piping and the coolant leaving the reactor through line 36 would have to be throttled to equalize the pressures of the two fluids at T 65.

A specific example of a reactor system incorporating the present invention is given in Table I.

*Table I*

Reactor inlet (30):
    Flow _____ lbs./hr__ $26.9 \times 10^6$
    Pressure _____ p.s.i__ 3650
    Temperature _____ °F__ 750

Reactor extraction outlet (34):
    Flow _____ lbs./hr__ $12.8 \times 10^6$
    Pressure _____ p.s.i__ 3475
    Temperature _____ °F__ 1050

Reactor outlet (36):
    Flow _____ lbs./hr__ $14.1 \times 10^6$
    Pressure _____ p.s.i__ 3475
    Temperature _____ °F__ 950

High pressure turbine (38) inlet:
    Flow _____ lbs./hr__ $7.1 \times 10^6$
    Pressure _____ p.s.i__ 3475
    Temperature _____ °F__ 1050

Intermediate pressure turbine (40) inlet:
    Flow _____ lbs./hr__ $6.5 \times 10^6$
    Pressure _____ p.s.i__ 736
    Temperature _____ °F__ 1000

Net system output _____ megawatts__ 1000

While a reactor system incorporating an open cycle has been illustrated, it will be appreciated that the steam turbines disclosed may be replaced by a closed cycle using heat exchangers, wherein the heat generated within the reactor may be transferred to a secondary fluid by the reactor coolant fluid. Thus, the lower temperature reactor coolant fluid would be used in the boiler of the secondary fluid circuit while the higher temperature reactor coolant fluid would be utilized in the superheat and reheat heat exchangers of the secondary circuit. Accordingly, the present invention will provide the highest temperature and thus the most efficient coolant to the areas where it is most critical.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A nuclear reactor system comprising a nuclear reactor, a turbine exterior of said reactor, a mixing T, said reactor having first and second coolant flow zones therethrough and means defining a coolant inlet common to said flow zones, said flow zones being arranged for parallel flow of coolant therethrough from said inlet, means for circulating a coolant fluid through said reactor system, said first coolant flow zone having a substantially constant radial power level, said second coolant flow zone having a relatively large power gradient thereacross, means for heating said fluid flowing through said first zone to a higher temperature than the fluid flowing through said second zone, means connecting said first flow zone to the inlet of said turbine, means connecting said second flow zone to a first inlet of said mixing T, means connecting the outlet of said turbine to a second inlet of said mixing T, and means connecting the outlet of said mixing T to said reactor inlet.

2. A nuclear reactor system comprising a nuclear reactor, a high pressure turbine, an intermediate pressure turbine, a heat exchanger having a primary side and a secondary side, a mixing T, said reactor having first and second coolant flow zones therethrough and means defining a coolant inlet common to said flow zones, said flow zones being arranged for parallel flow of coolant therethrough from said inlet, means for circulating a coolant fluid through said reactor system, said first coolant flow zone having a substantially constant radial power level, said second coolant flow zone having a relatively large power gradient thereacross, means for heating said fluid flowing through said first zone to a higher temperature than the fluid flowing through said second zone, means connecting said high pressure turbine and the primary side of said heat exchanger in parallel flow relationship, means connecting said first flow zone to the inlets of said turbine and the primary side of said heat exchanger, means connecting the outlet of said high pressure turbine to the inlet of the secondary side of said heat exchanger for passing the turbine exhaust in heat transfer relationship with the fluid in the primary side of said heat exchanger, means connecting the outlet of the secondary side of said heat exchanger to the inlet of said intermediate turbine, means for mixing the fluid leaving the primary side of said heat exchanger with the fluid leaving said second flow zone, means for introducing said mixed fluids into a first inlet of said mixing T, means connecting the outlet of said intermediate turbine to a second inlet of said mixing T, and means connecting the outlet of said mixing T to said reactor inlet.

3. A nuclear reactor system comprising a nuclear reactor, a high pressure turbine, an intermediate pressure turbine, a heat exchanger having a primary side and a secondary side, a mixing T, said reactor having first and second coolant flow zones therethrough and means defining a coolant inlet common to said flow zones, said flow zones being arranged for parallel flow of coolant therethrough from said inlet, means for circulating a coolant fluid through said reactor system, means for heating said fluid flowing through said first zone to a higher temperature than the fluid flowing through said second zone, means connecting said high pressure turbine and the primary side of said heat exchanger in parallel flow relationship, means connecting said first flow zone to the inlets of said turbine and the primary side of said heat exchanger, means connecting the outlet of said high pressure turbine to the inlet of the secondary side of said heat exchanger for passing the turbine exhaust in heat transfer relationship with the fluid in the primary side of said heat exchanger, means connecting the outlet of the secondary side of said heat exchanger to the inlet of said intermediate turbine, means connecting said second flow zone to a first inlet of said mixing T, means for mixing the fluid leaving the primary side of said heat exchanger with the fluid leaving said second flow zone before the first inlet of said mixing T, means connecting the outlet of said intermediate turbine to a second inlet of said mixing T, and means connecting the outlet of said mixing T to said reactor inlet.

4. A nuclear reactor system comprising a nuclear reactor, a high pressure turbine, an intermediate pressure turbine, a heat exchanger having a primary side and a secondary side, a mixing T, said reactor having first and second coolant flow zones therethrough and means defining a coolant inlet common to said flow zones, said flow zones being arranged for parallel flow of coolant therethrough from said inlet, means for circulating a coolant fluid through said reactor system, means for heating said fluid flowing through said first zone to a higher temperature than the fluid flowing through said second zone, means connecting said high pressure turbine and the primary side of said heat exchanger in parallel flow relationship, means connecting said first flow zone to the inlets of said turbine and the primary side of said heat exhanger, means connecting the outlet of said high pressure turbine to the inlet of the secondary side of said heat exchanger for passing the turbine exhaust in heat transfer relationship with the fluid in the primary side of said heat exchanger to reheat said turbine exhaust, means connecting the outlet of the secondary side of said heat exchanger to the inlet of said intermediate turbine, means for raising the pressure of the fluid leaving the primary side of said heat exchanger to the pressure of the fluid leaving the second flow zone, means for mixing the fluid leaving the primary side of said heat exchanger with the fluid leaving said second flow zone, means for introducing said mixed fluids into a first inlet of said mixing T, means connecting the outlet of said intermediate turbine to a second inlet of said mixing T, and means connecting the outlet of said mixing T to said reactor inlet.

5. A nuclear reactor system comprising a nuclear reactor, a high pressure turbine, an intermediate pressure turbine, a low pressure turbine, a condenser, a heat exchanger having a primary side and a secondary side, a mixing T, said reactor having first and second coolant flow zones therethrough and means defining a coolant inlet common to said flow zones, said flow zones being arranged for parallel flow of coolant therethrough from said inlet, means for circulating a coolant fluid through said reactor system, means for heating said fluid flowing through said first zone to a higher temperature than the fluid flowing through said second zone, means connecting said high pressure turbine and the primary side of said heat exchanger in parallel flow relationship, means connecting said first flow zone to the inlets of said turbine and the primary side of said heat exchanger, means connecting the outlet of said high pressure turbine to the inlet of the secondary side of said heat exchanger for passing the turbine exhaust in heat transfer relationship with the fluid in the primary side thereof to reheat said turbine exhaust, means connecting the outlet of the secondary side of said heat exchanger to the inlet of said intermediate turbine, means connecting the outlet of said intermediate turbine to the inlet of said low pressure turbine, means connecting the outlet of said low pressure turbine to said condenser, means for raising the pressure of the fluid leaving the primary side of said heat exchanger to the pressure of the fluid leaving the second flow zone, means for mixing the fluid leaving the primary side of said heat exchanger with the fluid leaving said second flow zone, means for introducing said mixed fluids into a first inlet of said mixing T, means for raising the pressure of the fluid leaving the condenser to the pressure of said mixed fluids and for introducing it into a second inlet of said mixing T to be heated by said mixed fluids, and means for connecting the outlet of said mixing T to said reactor inlet.

6. A nuclear reactor system comprising a nuclear reactor, a turbine, a mixing T, said reactor having a coolant inlet and first and second coolant flow zones therethrough, said flow zones being arranged in substantially parallel flow relationship, means for circulating a coolant fluid through said reactor system, means for heating said fluid flowing through said first zone to a higher temperature than the fluid flowing through said second zone, a baffle means at the outlet of said first zone arranged to confine the flow of coolant leaving said first zone, a coolant extraction line communicating with the interior of said baffle means to remove a portion of the coolant from said first zone, said baffle means being open beyond said extraction line to the outlet of said second zone to permit mixing of the portion of the fluid from said first zone remaining within said baffle means with the coolant from the second zone, said extraction line connecting said first flow zone to the inlet of said turbine, means connecting said second flow zone to said mixing T, means connecting the outlet of said turbine to said mixing T, and means connecting said mixing T to said reactor inlet.

7. A nuclear reactor system comprising a nuclear reactor, a high pressure turbine, an intermediate pressure turbine, a low pressure turbine, a condenser, a reheat heat exchanger having a primary side and a secondary side, a mixing T, said reactor having a coolant inlet and first and second coolant flow zones therethrough, said flow zones being arranged in substantially parallel flow relationship, a circulating pump arranged to circulate a coolant fluid through said reactor system, means for heating said fluid flowing through said first zone to a higher temperature than the fluid flowing through said second zone, a baffle means at the outlet of said first zone arranged to confine the flow of coolant leaving said first zone, a coolant extraction line communicating with the interior of said baffle means to remove a portion of the coolant from said first zone, said baffle means being open beyond sair extraction line to the outlet of said second zone to permit mixing of the portion of the fluid from said first zone remaining within said baffle means with the coolant from the second zone, means connecting said high pressure turbine and the primary side of said reheat exchanger in parallel flow relationship, said extraction line connecting said first flow zone to the inlets of said turbine and the primary side of said reheat heat exchanger, means connecting the outlet of said high pressure turbine to the inlet of the secondary side of said reheat heat exchanger for passing the turbine exhaust in heat transfer relationship with the fluid in the primary side thereof to reheat said high pressure turbine exhaust, means connecting the outlet of the secondary side of said heat exchanger to the inlet of said intermediate turbine, means connecting the outlet of said intermediate turbine to the inlet of said low pressure turbine, means connecting the outlet of said low pressure turbine to said condenser, pump means for raising the pressure of the fluid leaving the primary side of said reheat heat exchanger to the pressure of the fluid leaving the second flow zone, means for mixing the fluid leaving the primary side of said heat exchanger with the fluid leaving said second flow zone, means for introducing said mixed fluids into a first inlet of said mixing T, pump means for raising the pressure of the fluid leaving the condenser to the pressure of said mixed fluids and for introducing it into a second inlet of said mixing T to be heated and vaporized by said mixed fluids, and means including said circulating pump connecting the outlet of said mixing T to said reactor inlet.

8. The method of operating a nuclear reactor system having a nuclear reactor with first and second coolant flow zones therethrough, said first coolant flow zone having a substantially constant radial power level, said second coolant flow zone having a relatively large power gradient thereacross, said flow zones being arranged in parallel flow relationship, and means for removing heat from said coolant, comprising the steps of passing a coolant fluid from a common inlet chamber through said flow zones in parallel flow relationship, heating said fluid in said first zone to a higher temperature than said fluid in said second zone, passing at least a portion of said fluid from said first zone through said heat removing means and cooling said fluid, partially heating said cooled portion of said fluid by mixing said portion with all of the remainder of said fluid from said first and second zones, and reintroducing said fluid into said reactor.

9. The method of operating a nuclear reactor system having a nuclear reactor with a first and a second coolant flow zone therethrough, said first coolant flow zone having a substantially constant radial power level, said second coolant flow zone having a relatively large power gradient thereacross, said flow zones being arranged in parallel flow relationship, and a turbine exterior of said reactor, comprising the steps of passing a coolant fluid from a common inlet chamber through said flow zones in parallel flow relationship so that said fluid in said first zone is heated to a higher temperature than said fluid in said second zone, passing at least a portion of said fluid from said first zone through said turbine and cooling said fluid, reheating said fluid passing through said turbine with a second portion of said fluid from said first zone, partially heating said cooled second portion of said fluid by mixing said portion with all of the remainder of said fluid from said first and second zones, and reintroducing said fluid into said reactor.

10. The method of operating a nuclear reactor system having a nuclear reactor, a high pressure turbine, an intermediate pressure turbine, and a reheat heat exchanger, said reactor having first and second coolant flow zones therethrough, said first coolant flow zone having a substantially constant radial power level, said second coolant flow zone having a relatively large power gradient thereacross, said flow zones being arranged in substantially parallel flow relationship, comprising the steps of circulating a coolant fluid from a common inlet chamber through said flow zones in parallel flow relationship so that said fluid flowing through said first zone is heated to a higher temperature than the fluid flowing through said second zone, passing said coolant from said first flow zone to the inlets of said turbine and the primary side of said reheat heat exchanger, passing said coolant from the outlet of said high pressure turbine through the secondary side of said reheat heat exchanger in indirect heat transfer contact with the fluid in the primary side, passing the reheated coolant from the secondary side of said reheat heat exchanger to the inlet of said intermediate turbine, mixing the fluid leaving the primary side of said heat exchanger with the fluid leaving said second flow zone, and mixing the coolant from said intermediate turbine with said previously mixed coolant prior to reintroduction into said reactor.

11. The method of operating a nuclear reactor system having a nuclear reactor, a high pressure turbine, an intermediate pressure turbine, a low pressure turbine, a condenser, a reheat heat exchanger, and a mixing T, said reactor having first and second coolant flow zones therethrough, said first coolant flow zone having a substantially constant radial power level, said second coolant flow zone having a relatively large power gradient thereacross, said flow zones being arranged in substantially parallel flow relationship, comprising the steps of circulating a coolant fluid from a common inlet chamber through said flow zones in parallel relationship so that said fluid flowing through said first zone is heated to a higher temperature than the fluid flowing through said second zone, passing said coolant from said first flow zone to the inlets of said turbine and the primary side of said reheat heat exchanger, reheating the coolant from the outlet of said high pressure turbine by passing the coolant through the secondary side of said reheat heat exchanger in indirect heat transfer contact with the fluid in the primary side thereof, passing the reheated coolant from the outlet of the secondary side of said heat exchanger serially through said intermediate turbine and said low pressure turbine to said condenser, raising the pressure of the fluid leaving the primary side of said heat exchanger to the pressure of the fluid leaving the second flow zone and then mixing the two fluids, introducing said mixed fluids into a first inlet of said mixing T, raising the pressure of the fluid leaving the condenser to the pressure of said mixed fluids and then introducing it into a second inlet of said mixing T to be heated by said mixed fluids, and reintroducing the fluid into said reactor.

References Cited

UNITED STATES PATENTS

| | | | |
|---|---|---|---|
| 3,152,962 | 10/1964 | Kagi | 176—59 |
| 3,161,572 | 12/1964 | Kagi | 176—60 X |
| 3,162,581 | 12/1964 | Brunner | 176—59 |
| 3,175,953 | 3/1965 | Nettel et al. | 176—60 |
| 3,180,798 | 4/1965 | Brunner | 176—59 |
| 3,231,475 | 1/1966 | Kagi | 176—60 |

FOREIGN PATENTS 897,416  5/1962  Great Britain.

REUBEN EPSTEIN, *Primary Examiner.*